US010990413B2

(12) United States Patent
Wang

(10) Patent No.: US 10,990,413 B2
(45) Date of Patent: *Apr. 27, 2021

(54) MAINFRAME SYSTEM STRUCTURING

(71) Applicant: International Business Machines Corporation, Armonk, NY (US)

(72) Inventor: Wei Wei Wang, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/505,157

(22) Filed: Jul. 8, 2019

(65) Prior Publication Data

US 2019/0332393 A1 Oct. 31, 2019

Related U.S. Application Data

(63) Continuation of application No. 15/237,963, filed on Aug. 16, 2016, now Pat. No. 10,346,176.

(51) Int. Cl.
*G06F 9/4401* (2018.01)
*G06F 9/455* (2018.01)

(52) U.S. Cl.
CPC ............ *G06F 9/4406* (2013.01); *G06F 9/455* (2013.01)

(58) Field of Classification Search
CPC ................................ G06F 9/4406; G06F 9/455
See application file for complete search history.

(56) References Cited

U.S. PATENT DOCUMENTS

| | | | |
|---|---|---|---|
| 8,265,980 B2 | 9/2012 | Ochs | |
| 8,341,014 B2 | 12/2012 | Bobak | |
| 8,645,276 B2 | 2/2014 | Wong | |
| 8,683,271 B2 | 3/2014 | Lazzaro | |
| 9,122,784 B2 | 9/2015 | Dagan | |
| 9,292,357 B2 * | 3/2016 | Busaba | G06F 9/467 |
| 10,565,086 B2 * | 2/2020 | Michelsen | G06F 8/70 |
| 2006/0047992 A1 | 3/2006 | Gerard | |
| 2008/0098393 A1 * | 4/2008 | Chai | G06Q 20/04 718/101 |

(Continued)

OTHER PUBLICATIONS

List of IBM Patents or Patent Applications Treated as Related, Jul. 8, 2019, 2 pages.

(Continued)

*Primary Examiner* — Charles E Anya
(74) *Attorney, Agent, or Firm* — Brian D. Welle

(57) ABSTRACT

A mainframe of an organization includes a transaction layer and a middleware layer and an operating system layer is structured by steps including identifying that transactions of the transaction layer are related to a classification of the organization. The steps further include identifying resources of the mainframe for executing the transactions, wherein the resources includes a processor and a memory. The steps include identifying transaction access paths between the transaction layer and the middleware layer resources that are associated with the middleware layer. The steps include identifying resources that are associated with the operating system layer and generating a service model of the mainframe that includes a visual representation of the transactions and the resources that are related to the classification across the middleware layer and the transaction layer and the operating system layer of the mainframe.

18 Claims, 7 Drawing Sheets

(56) References Cited

U.S. PATENT DOCUMENTS

| | | |
|---|---|---|
| 2008/0295100 A1 | 11/2008 | Ainsworth |
| 2010/0218104 A1 | 8/2010 | Lewis |
| 2010/0223166 A1 | 9/2010 | Wallace |
| 2011/0307590 A1* | 12/2011 | Mogalayapalli ........ G06F 9/485 |
| | | 709/223 |
| 2013/0124455 A1 | 5/2013 | Goodson |
| 2014/0316845 A1 | 10/2014 | Nayak |
| 2015/0199212 A1* | 7/2015 | Acheff .................... G06F 11/36 |
| | | 719/317 |
| 2015/0205713 A1 | 7/2015 | Michelsen |
| 2016/0350683 A1* | 12/2016 | Bester ................ G06Q 10/0633 |
| 2017/0286273 A1 | 10/2017 | Lau |
| 2017/0286274 A1 | 10/2017 | Lau |
| 2018/0052695 A1 | 2/2018 | Wang |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

Schuetze, R., "An intuitionistic fuzzy approach for IT service-level-management," 19th Int. Workshop on IFSs, Burgas, Jun. 4-6, 2015, Notes on Intuitionistic Fuzzy Sets, ISSN 1310-4926, vol. 21, 2015, No. 2, pp. 87-98.

\* cited by examiner

MAINFRAME SYSTEM STRUCTURING

BACKGROUND

The present invention relates generally to the field of data processing, and more particularly to software development, installation, and management.

Mainframe systems may be high performance computers used primarily by large organizations for critical applications, bulk data processing such as census, industry and consumer statistics, enterprise resource planning, and transaction processing. In computer science, transaction processing is information processing that is divided into individual, indivisible operations called transactions. Each transaction must succeed or fail as a complete unit; each transaction may never be only partially complete.

SUMMARY

Embodiments of the present invention disclose a method, computer program product, and system for dynamically structuring a mainframe. For example, the method may include a processor structuring a mainframe of an organization. The mainframe includes a transaction layer and a middleware layer and an operating system layer, wherein the transaction layer comprises applications and transaction of the application. The processor may structure the mainframe by identifying that a plurality of transactions of the transaction layer are related to a classification of the organization. The processor may further structure the mainframe by identifying a plurality of resources of the mainframe that may be used to execute the plurality of transactions, wherein the plurality of resources includes at least one processor and at least one memory. The processor may further structure the mainframe by identifying one or more transaction access paths between the transaction layer and the middleware layer to a first set of resources of the plurality of resources that are associated with the middleware layer. The processor may further structure the mainframe by identifying a second set of resources of the plurality of resources that are associated with the operating system layer. The processor may further structure the mainframe by generating a service model of the mainframe that includes a visual representation of the plurality of transactions and the plurality of resources that are related to the classification across the middleware layer and the transaction layer and the operating system layer of the mainframe

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
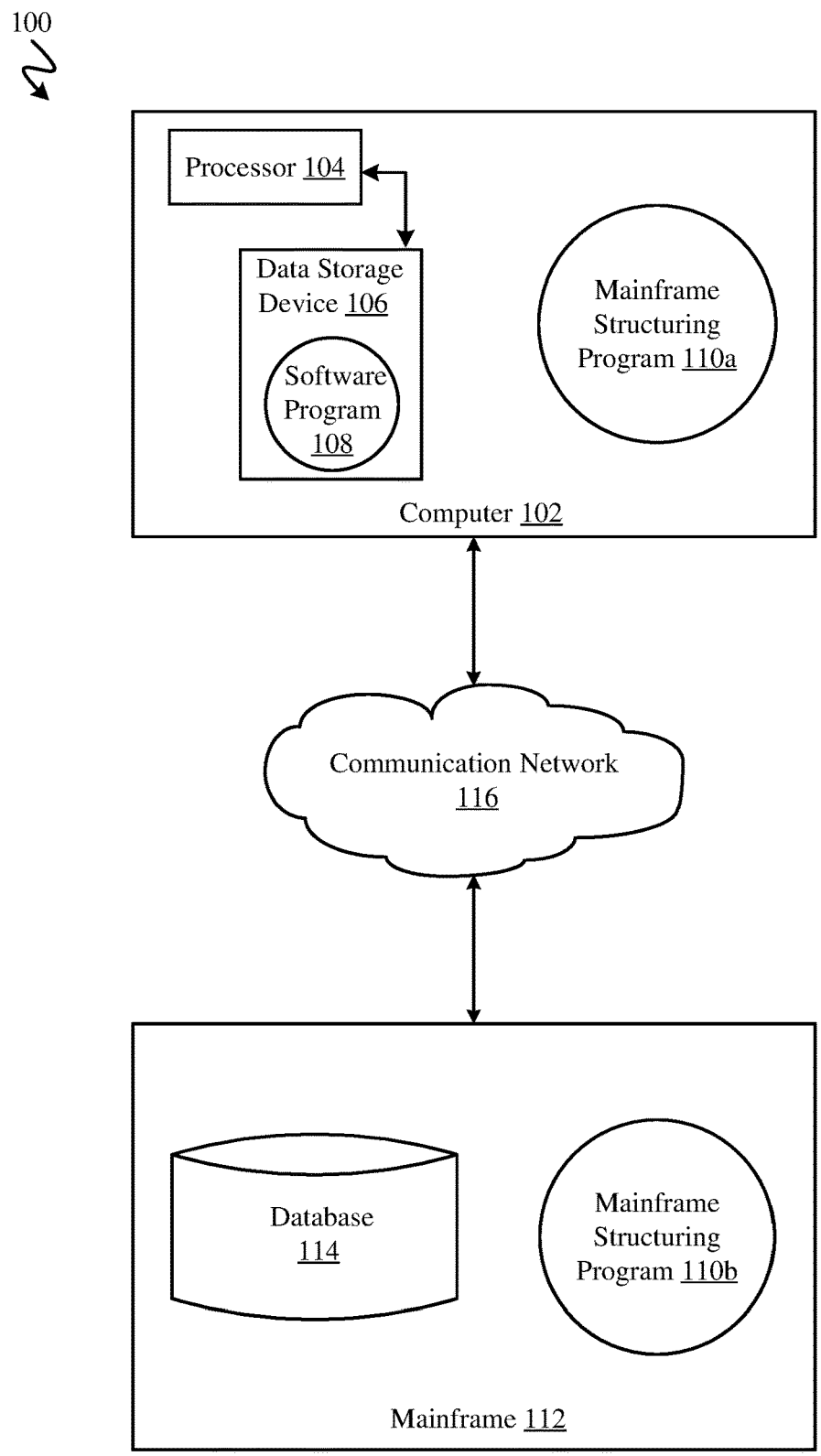
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

IBM®, CICS®, CICSPlex®, Parallel Sysplex®, DB2®, Tivoli®, and z/OS® and all IBM CICS®, CICSPlex®, Parallel Sysplex®, DB2®, Tivoli®, and z/OS®-based trademarks and logos are trademarks or registered trademarks of International Business Machines Corporation and/or its affiliates.

Centralized monitoring of a large enterprise's or institution's data center may be transforming from a traditional technical component oriented resource monitoring of mainly mainframes to a business service oriented monitoring. This transformation from traditional resource monitoring may only be used by information technology (IT) professionals operating on a mainframe who may be unable to properly reflect business impact, scope, and degree of any given business transaction. The lack of IT professionals to properly understand how a business transaction may impact a mainframe may make it hard for business personnel and IT professionals to collaborate in responding to business transaction difficulties. Business service oriented monitoring, on the contrary, through auto associating IT software and hardware problems of a mainframe with business services, may increase the likelihood of an accurate view of business service status by IT professionals. This in turn may enable predictive analytics that detect abnormal service behavior for predictive root causes for the given business transactions, and service impact analysis—reducing unnecessary incidents and problems, and allowing for prioritized response based on the business impact—even before customers have detected a problem or called into the service desk.

Currently there is no common modeling method that incorporates business transactions and operating software into a mainframe structure, more specifically for a mainframe middleware, such as Customer Information Control System (CICS®) or Information Management System (IMS) based online transaction processing system (OLTP). This may be due to a mainframe's integrated business type variety and a large amount of IT software and hardware objects (e.g., the number of transaction types and programs may be on the order of thousands or more, and database tables may be on the order of tens of thousands of records or more). A resource object's interdependency within a mainframe may be extremely complex (e.g., middleware cluster, database cluster, operating system cluster and transaction, program, database table access relationship).

Therefore, it may be advantageous to, among other things, provide a way to integrate substantially similar business-transaction software and hardware within a mainframe business service model. According to one embodiment, a mainframe online-transaction-processing system can comprise four layers: a transaction layer, a middleware layer, a database layer, and an operating system layer. The transaction layer may contain all application transactions (e.g., middleware, such as CICS® or IMS transactions). Transactions may call various application programs, so the transaction layer may comprise transactions, programs, and applications. The middleware layer may include multiple CICS® or IMS subsystems. As transactions may run in middleware subsystems, the transaction layer may be linked with the middleware layer. The database layer may include an application database table and a database subsystem, and the application database tables may run in the database subsystem layer. Through a calling program, the transaction layer may access one or more application database tables, which may associate the transaction layer with the database layer. The operating system layer may include one or more operating systems (OS) (e.g., a z/OS® operating system). In various embodiments, all above application transactions, middleware and databases may run in the z/OS® system (e.g., a traditional CICS®/DB2® constituted mainframe online transaction processing system).

Additionally, in some embodiments of the present disclosure, the middleware layer and the database layer may include a direct relationship with the transaction layer, and the interdependency between the middleware layer and the database layer may not affect any business impact analysis or resource monitoring. Therefore, the middleware layer and database layer may be combined into a single layer. Furthermore, the middleware layer, the database layer, and the operating systems layer may also overlap in some aspects. For example, the middleware layer may include a CICSPlex® application owning region (AOR) group and a terminal owning region (TOR) group, and the database layer may include a database (e.g., DB2®) data sharing cluster that may comprise multiple database (e.g., DB2® subsystems) and the operating system layer may include a cluster of mainframes (e.g., Parallel Sysplex®), which may comprise multiple operating systems (e.g., z/OS® systems). A Parallel Sysplex® may be a cluster of IBM® mainframes acting together as a single system image with z/OS®. Parallel Sysplex® may combine data sharing and parallel computing to allow a cluster of up to thirty two systems to share a workload for high performance and high availability.

The following described exemplary embodiments provide a system, method and program product for dynamically combining redundant hardware and software components from one or more layers within a mainframe. As such, the present embodiment has the capacity to improve the technical field of data processing by organizing a mainframe according to business transactions within the mainframe so that technical issues and business impacts of business decisions may be handled more effectively by IT professionals. More specifically, embodiments of the present disclosure are directed to improving the relationship of business transactions with the operating software components within a mainframe, and then generating a visual display of the business impact on a mainframe.

It is to be understood that the aforementioned advantages are example advantages and should not be construed as limiting. Embodiments of the present disclosure can contain all, some, or none of the aforementioned advantages while remaining within the spirit and scope of the present disclosure.

Referring to FIG. 1, an exemplary networked computer environment 100 in accordance with one or more embodiments is depicted. The networked computer environment 100 may include a computer 102 with a processor 104 and a data storage device 106 that is enabled to run a software program 108 and a mainframe structuring program 110a. The networked computer environment 100 may also include a mainframe 112 that is enabled to run a mainframe structuring program 110b that may interact with a database 114 and a communication network 116. The networked computer environment 100 may include one or more computers 102 and mainframes 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the mainframe 112 via the communications network 116. The communications network 116 may include connections, such as wired links (e.g., Ethernet), wireless communication links, or fiber optic cables. As will be discussed with reference to FIG. 4, mainframe 112 may include internal components 902a and external components 904a, respectively, and client computer 102 may include internal components 902b and external components 904b, respectively. Mainframe 112 may also operate in a cloud computing service model, such as Software as a Service (SaaS), Platform as a Service (PaaS), or Infrastructure as a Service (IaaS). Mainframe 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the mainframe structuring program 110a, 110b may interact with a database 114 that may be embedded in various storage devices, such as, but not limited to a computer/mobile device 102, a networked mainframe 112, or a cloud storage service.

According to the present embodiment, a user using a client computer 102 or a server computer 112 may use the mainframe structuring program 110a, 110b (respectively) to organize hardware and software components of one or more layers within a mainframe, and then display a visual depiction within the of the impact of any business transactions associated with the mainframe within a user interface (UI). The computer 102 (e.g., phone) may be used to display the results from the organized hardware and software, and may allow a user to submit changes as appropriate. The mainframe structuring method is explained in more detail below with respect to FIGS. 2 and 3.

Figure 2:
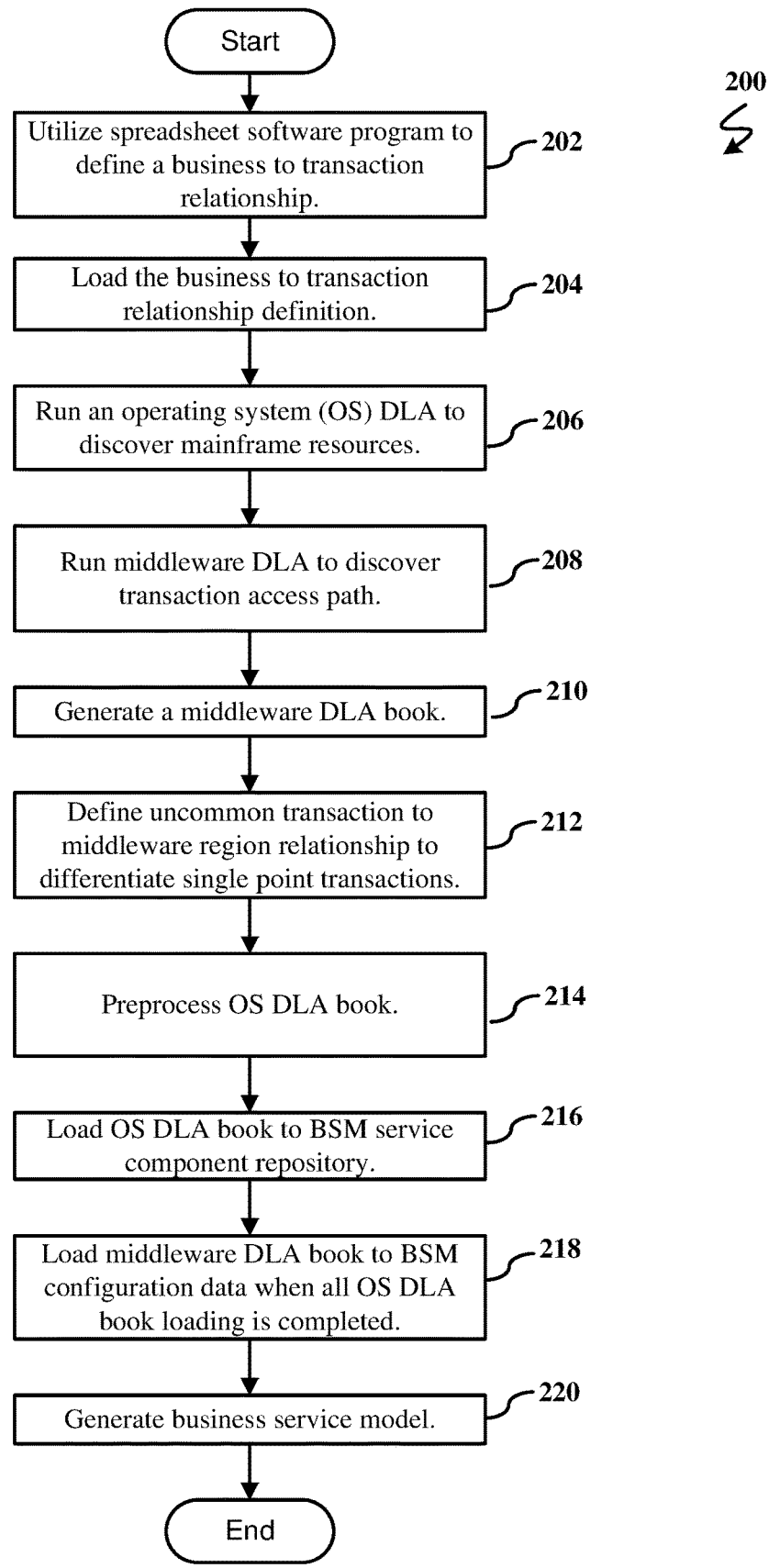
FIG. 2 illustrates an operational flowchart illustrating an exemplary mainframe structuring process by a mainframe structuring program according to at least one embodiment.

Referring now to FIG. 2, an operational flowchart illustrating the exemplary mainframe restructuring process 200 by the mainframe structuring program 110a and 110b (FIG. 1) according to at least one embodiment is depicted. At 202, the mainframe structuring program (e.g., 110a and 110b shown in FIG. 1) may utilize a spreadsheet software program to define a user transaction relationship. Hereinafter, a user transaction relationship may be referred to as a business to transaction relationship. The business to transaction relationship may be a relationship between any business related actions (e.g., business services, business decisions, etc.) and their associated transactions. For example, a business to transaction relationship may be receiving a loan from a bank and the associated transactions necessary to receive a loan. For example, the associated transaction may be to check a user's credit score, or to process a loan. The mainframe structuring program 110a and 110b (FIG. 1) may utilize spreadsheet software program to define all business to transaction relationships within a mainframe.

At 204, the mainframe structuring program 110a and 110b (FIG. 1) may load the business to transaction relationship definition. For example, the mainframe structuring program 110a and 110b (FIG. 1) may load the business to transaction relationship definition in a data repository (e.g., database 114) in order to create a model of all the business to transaction relationships within a mainframe, or within a single application within the mainframe.

At 206, the mainframe structuring program 110a and 110b (FIG. 1) may run an operating system (OS) (e.g., z/OS®) discovery library adaptor (DLA) to discover any resources (e.g., files, computer processing unit (CPU), memory, random access memory, input/output, network connections, etc.) within the mainframe. The z/OS® DLA is an IBM software for CICS® transaction server (TS) resource configuration discovery. The mainframe structuring program 110a and 110b (FIG. 1) may discover any resources so that the business to transaction relationship may be able to utilize any discovered resources that may improve the transaction. For example, if the transaction for a particular business decision needs additional memory in order to complete, then any discovered memory may be utilized to facilitate the transaction.

At 208 the mainframe structuring program 110a and 110b (FIG. 1) may run any middleware DLA (e.g., CICS® interdependency analyzer (IA) query) to discover one or more transaction access paths. CICS® IA is an IBM software for CICS® TS resource configuration discovery. The mainframe structuring program 110a and 110b (FIG. 1) may discover any resources associated with middleware so that the business to transaction relationship may be able to utilize any discovered resources that may improve the transaction. Additionally, the mainframe structuring program 110a and 110b (FIG. 1) may discover a transaction path within the transaction layer to the middleware layer that may result in a shorter transaction time to complete the transaction.

At 210, the mainframe structuring program 110a and 110b (FIG. 1) may generate a middleware (e.g., CICS® IA) DLA book. The middleware book may be an organized data repository (e.g., database 114) that includes all of the resources that were discovered by the mainframe structuring program 110a and 110b (FIG. 1) at 206 and 208. The book may be organized according to computing resource, or according to shortest transaction time and the associated access path for the particular transaction. Any discovered resource stored within the middleware DLA book may be retrieved by the mainframe structuring program 110a and 110b (FIG. 1). The mainframe structuring program 110a and 110b (FIG. 1) may also collect and analyze metadata about the middleware DLA book. The metadata may be analyzed by known hardware and software techniques commonly utilized in the art. The metadata may be analyzed to discover a shortest transaction access path. The mainframe structuring program 110a and 110b (FIG. 1) may store the metadata within the middleware DLA book.

At 212, the mainframe structuring program 110a and 110b (FIG. 1) may define uncommon transactions from the transaction layer to the middleware layer. The uncommon transactions may be transactions occurring less than 50% of all transactions. The mainframe structuring program 110a and 110b (FIG. 1) may identify any transactions within the transaction layer that have an access path to a single middleware instance or application (e.g., CICS®) in order to differentiate single point transactions from transactions that have an access path to multiple middleware (e.g., CICS®s), which are referred to herein as multiple point transactions. By doing so, the mainframe structuring program 110a and 110b (FIG. 1) may model the mainframe and any transaction within the mainframe more accurately. Also, the mainframe structuring program 110a and 110b (FIG. 1) may identify redundancies within the transaction layer and the middleware layer so that the redundancies may be eliminated.

At 214, the mainframe structuring program 110a and 110b (FIG. 1) may preprocess an OS (e.g., z/OS®) DLA book. The OS DLA book may be an organized data repository (e.g., database 114) that includes all of the resources that were discovered by the mainframe structuring program 110a and 110b (FIG. 1) that are associated with an operating system (e.g., z/OS®) of the mainframe. The OS DLA book may be organized according to computing resource, or according to shortest transaction time and the associated access path for the particular transaction. Any discovered resource stored within the OS DLA book may be retrieved by the mainframe structuring program 110a and 110b (FIG. 1). The mainframe structuring program 110a and 110b (FIG. 1) may also collect and analyze metadata about the OS DLA book. The metadata may be analyzed by known software techniques commonly utilized in the art. The metadata may be analyzed to discover a shortest transaction access path. The mainframe structuring program 110a and 110b (FIG. 1) may store the metadata within the OS DLA book.

The mainframe structuring program 110a and 110b (FIG. 1) may preprocess the OS DLA book so that the OS DLA book can differentiate common transactions and uncommon transactions. The user may set rules for differentiating between a common transaction and an uncommon transaction (e.g., the user could set the rules so that 33% of transactions are common instead of 50%). The common transactions may be transactions, such as single point transactions that are associated with a single middleware (e.g., CICS®), or may be transactions that are executed often, such as more often than fifty percent of all transactions. The uncommon transactions may be multiple transactions, such as transactions that are associated with multiple middleware (e.g., CICS®s), or are transactions that are executed less often than other transactions (e.g., less than fifty percent of all transactions).

At 216, the mainframe structuring program 110a and 110b (FIG. 1) may load the OS DLA book to a service manager (SM) (e.g., Tivoli® Business Service Manager (TBSM®)) repository. Hereinafter a SM may be referred to a business service manager (BSM) may monitor business services and track the business services against business objectives and technology infrastructures (e.g., the mainframe). BSM may show the operational status of services using prebuilt reports, scorecards, and dashboards for fast data analysis. BSM may further assist in assessing service levels throughout an organization for more effective service management. The BSM repository may be the database 114 or a portion of the database 114. At 218, the mainframe structuring program 110a and 110b (FIG. 1) may load the middleware DLA Book to the BSM in response to loading the OS DLA book to the BSM. In some cases, the middleware DLA book to the BSM prior to loading the OS DLA book to the BSM.

At 220, the mainframe structuring program 110a and 110b (FIG. 1) may generate a business service model. The business service model may be a visual representation of any transaction within the mainframe. The business service model may provide an analysis of all transactions within the mainframe, and generate predictive models of the transactions, as well as determine business impacts due to the transactions. The determined business impacts may be determined based on analyzing historical data store in a data repository (e.g., database 114) by utilizing known software techniques. The visual representation may be displayed within a UI. The UI may be integrated into a client device (e.g., smart phone, laptop, etc.). The visual representation may be transferred from the client device to another client device (e.g., generated by the mainframe structuring program 110b and transferred to mainframe structuring program 110a to be displayed on a screen computer 102). Once the mainframe structuring program 110a and 110b (FIG. 1) activates the business service model, the parsing process 200 may terminate.

According to at least one embodiment, the mainframe structuring program 110a and 110b (FIG. 1) may be responsible for a business service model resource discovery, as described at 206 and 208, including auto discovery and manual discovery according to resource characteristic. As nearly all mainframe software and hardware resources in a business service model, such as middleware (e.g., CICS) regions, transactions, programs and database tables are utilized often, their interdependency relationships may be very complex and dynamic. Therefore, auto discovery of these resources may be key for a service model building system to function. The mainframe structuring program 110a and 110b (FIG. 1) may integrate resource discovery tools or scripts (e.g., DLA) to increase the likelihood of collecting information in incremental time intervals, and format and load configuration management database processing. For example, a z/OS® DLAV2.2 for z/OS® LPAR, DB2®, CICS®, CICS® transaction and its relationship dynamic discovery may develop CICS® IA DLA script for a CICS® transaction, program and DB2® application table relationship dynamic discovery. Additional resources, business type, channel and its included application transactions may take up small portions of a mainframe and may not be universal. Therefore the mainframe structuring program 110a and 110b (FIG. 1) may utilize a spreadsheet software program based manual input method to handle these types of resources. The mainframe structuring program 110a and 110b (FIG. 1) may automatically transform the spreadsheet software program and load the configuration management database. The above resource information may be stored in a service object table of a configuration management database (e.g., database 114). Resource relationship data may be stored in a service interdependency correlation relationship table of the configuration management database.

The configuration management database (e.g., database 114) may be the public data pool. A top service instance may take a name as key word, and then the mainframe structuring program 110a and 110b (FIG. 1) may read the service object table of the configuration management database to acquire resource interdependency information to present to a business service model, which may complete modeling based on various business transaction relationships.

Additionally, the mainframe structuring program 110a and 110b (FIG. 1) may extract configuration management database model resource data, as well as any business transaction relationship data (including service instance id, service type, parent service instance id, parent service instance name, child service instance id, child service instance name, parent service instance template, child service instance template), and then generate a business service model relationship database table.

For example, the business service model relationship database table may be described as shown below:

```
CREATE TABLE component_rel (
   srcradinstanceid      radinstanceid varchar(1000) default null,
   srcclass              class varchar(92),
   srclabel              varchar(256),
   srcprimarytemplate    varchar(64),
   tgtradinstanceid      radinstanceid varchar(1000) default null,
   tgtclass              class varchar(92),
   tgtlabel              varchar(256),
   tgtprimarytemplate    varchar(64).
```

Figure 3:
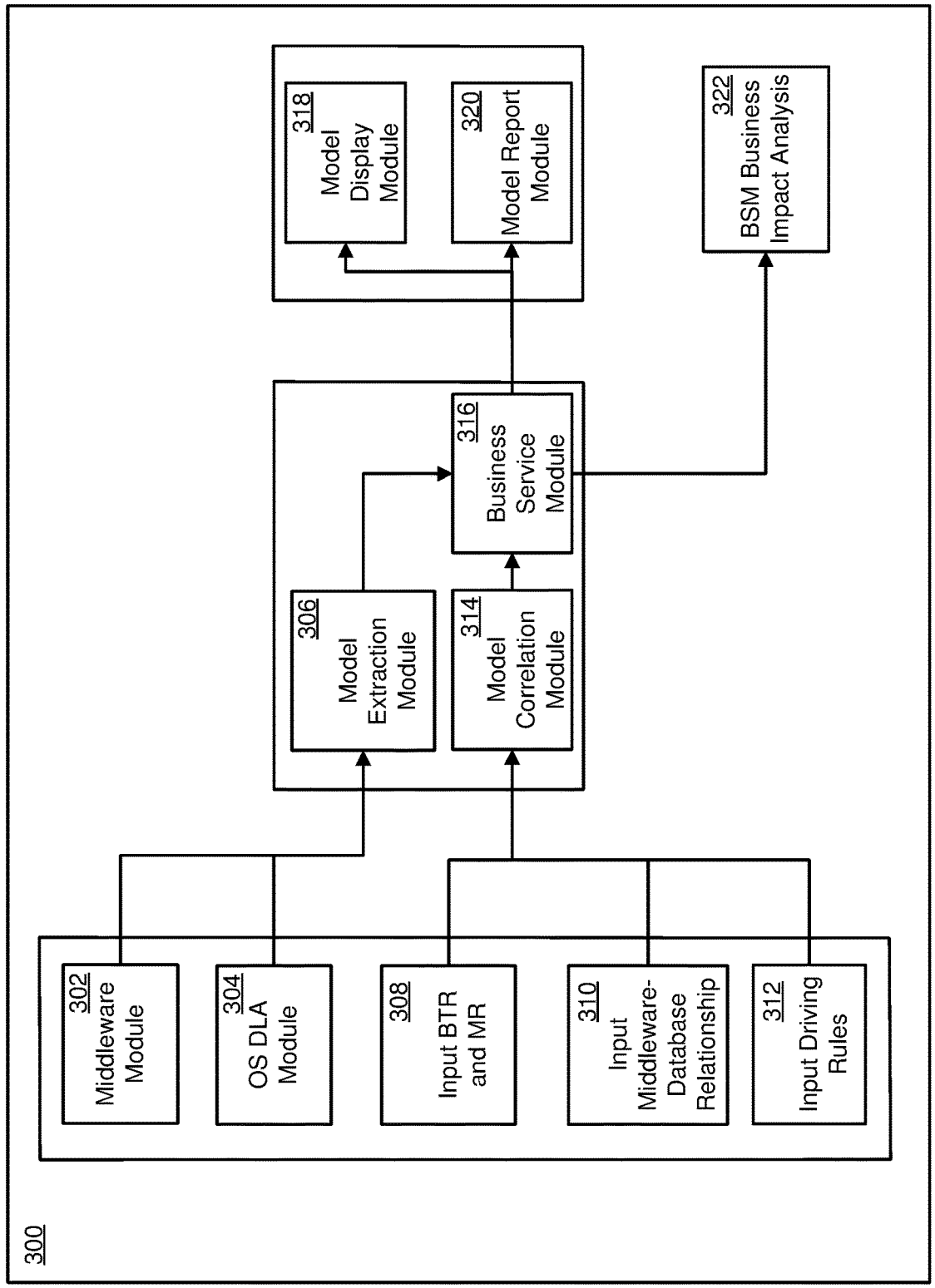
FIG. 3 illustrates an operational flowchart illustrating a mainframe configuration diagram according to at least one embodiment.

Referring now to FIG. 3, an operational diagram illustrating an exemplary mainframe structuring diagram 300 generated by the mainframe structuring program 110a and 110b (FIG. 1) according to at least one embodiment is depicted. The mainframe structuring program 110a and 110b (FIG. 1) may be an automatic program that may not require much manual input, and may be a self-adaptive system (e.g., may include a neural network). In some embodiments, the middleware (e.g., CICS® IA) may be utilized by the mainframe structuring program 110a and 110b (FIG. 1) to discover a business transaction path, as described at 208. One or more transaction paths may be discovered by the middleware module 302. Once the one or more business transaction paths have been discovered, the mainframe structuring program 110a and 110b (FIG. 1) may transmit an electrical signal that includes the one or more discovered business paths to the model extraction module 306.

In some embodiments, the mainframe structuring program 110a and 110b (FIG. 1) may also run OS (e.g., z/OS®) DLA module 304 to discover mainframe resources, as described at 206. The OS DLA module 304 may discover mainframe resources within the middleware layer and the database layer that are redundant and then physically integrate the redundant resources into an organized section of the mainframe. Once the mainframe structuring program 110a and 110b (FIG. 1) runs the OS DLA module 304 to discover mainframe resources, the mainframe structuring program 110a and 110b (FIG. 1) may transmit the discovered mainframe resources to the model extraction module 306 in the form of an electrical signal.

In some embodiments, the mainframe structuring program 110a and 110b (FIG. 1) may input the business to transaction relationship (BTR) and mapping rules (MR) 308 into the mainframe. The MR may be rules for a flow of data or for any BST from the start at the transaction layer through the middleware layer and database layer up the end at the software layer. Once the mainframe structuring program 110a and 110b (FIG. 1) inputs the business to transaction relationship (BTR) and mapping rules (MR) into the mainframe, the mainframe structuring program 110a and 110b (FIG. 1) may transmit the BTR and the MR into the model correlation module 314.

In some embodiments, the mainframe structuring program 110a and 110b (FIG. 1) may input a middleware (e.g., CICS®)/database (e.g., DB2®) relationship 310 into the mainframe. The middleware/database relationship 310 may be a model of the redundancies or overlap of the middleware and the database in the database layer. The mainframe structuring program 110a and 110b (FIG. 1) may input the middleware/database relationship so that the database layer may be more organized in the mainframe, to increase the flow of data in the mainframe. Once the mainframe structuring program 110a and 110b (FIG. 1) inputs a middleware/database relationship 310 into the mainframe, the mainframe structuring program 110a and 110b (FIG. 1) may transmit the middleware/database relationship into the model correlation module 314.

In some embodiments, the mainframe structuring program 110a and 110b (FIG. 1) may input the driving rules 312. The driving rules may define a condition of a service status change, including two types: one may be a service status change condition triggered by external event, called an incoming status rule. The incoming status rule may be an external-event-drive-service-instance-status from good to bad or from bad to good, or a lower-service-instance-status drives upper-service-instance-status change, called good, marginal, a bad aggregation. Additionally, not all external or internal events may cause a business impact. A business impact analysis may first determine which event is related with the business model in order to determine an external event selection rule. An internal or external event that may impact business availability can be selected. Accordingly, an internal or external event impact may be defined as a fault event, fault recovery event, performance event, and/or performance recovery event.

In some embodiments, the mainframe structuring program 110a and 110b (FIG. 1) may activate the model extraction module 306. The model extraction module 306 may create a model based on the discovered resources. The model may be an outline of a data flow within the mainframe from a transaction within the transaction layer to an operation software in the software layer. The model may be an outline for a visual representation of the data flow that may be displayed within an UI. Once the mainframe structuring program 110a and 110b (FIG. 1) activates the model extraction module 306, the mainframe structuring program 110a and 110b (FIG. 1) may transmit the extracted model to the business service module 316 in the form of an electrical signal.

In some embodiments, the mainframe structuring program 110a and 110b (FIG. 1) may activate the model correlation module 314. The model correlation module 314 may determine how the model of the mainframe may correlate to the physical mainframe, and also outline any differences between the model of the mainframe and the physical model. Once the mainframe structuring program 110a and 110b (FIG. 1) activates the model correlation module 314, the mainframe structuring program 110a and 110b (FIG. 1) may transmit the correlation model to the business service module 316 in the form of an electrical signal.

In some embodiments, the mainframe structuring program 110a and 110b (FIG. 1) may activate business service module 316. The business service module 316 may determine the business impact of any transaction within the transaction layer, and any implications associated with the transaction. A visual representation may be generated to display within a UI. The visual representation is discussed and may be depicted in FIG. 4. Once the mainframe structuring program 110a and 110b (FIG. 1) activates the business service module 316, the mainframe structuring program 110a and 110b (FIG. 1) may transmit the business service model to the model display module 318, the business service module 320, and the BSM (e.g., TBSM®) business impact analysis 322 where a business impact analysis may be generated in the form of an electrical signal.

In some embodiments, the mainframe structuring program 110a and 110b (FIG. 1) may activate the model display module 318. The model display module 318 may display any model within a UI. The model displayed by the model display module 318 may be depicted in FIG. 4. The UI may be displayed within a client device. In some embodiments, the mainframe structuring program 110a and 110b (FIG. 1) may activate the business service module 320. The model report module 320 may generate a visual display of any business impacts caused by any transactions so that an IT professional may more easily associate the software and hardware of the mainframe with the business impacts. In some embodiments, the mainframe structuring program 110a and 110b (FIG. 1) may activate the BSM (e.g., TBSM®) business impact analysis 322. The BSM (e.g., TBSM®) business impact analysis 322 may generate a business impact analysis that may predict actions that could be taken by IT professionals in order to solve software and hardware issues more effectively. Once the mainframe structuring program 110a and 110b (FIG. 1) activates the model display module 318, the business service module 320, and the BSM (e.g., TBSM®) business impact analysis 322, the operational diagram illustrating an exemplary mainframe structuring diagram 300 may terminate.

Figure 4:
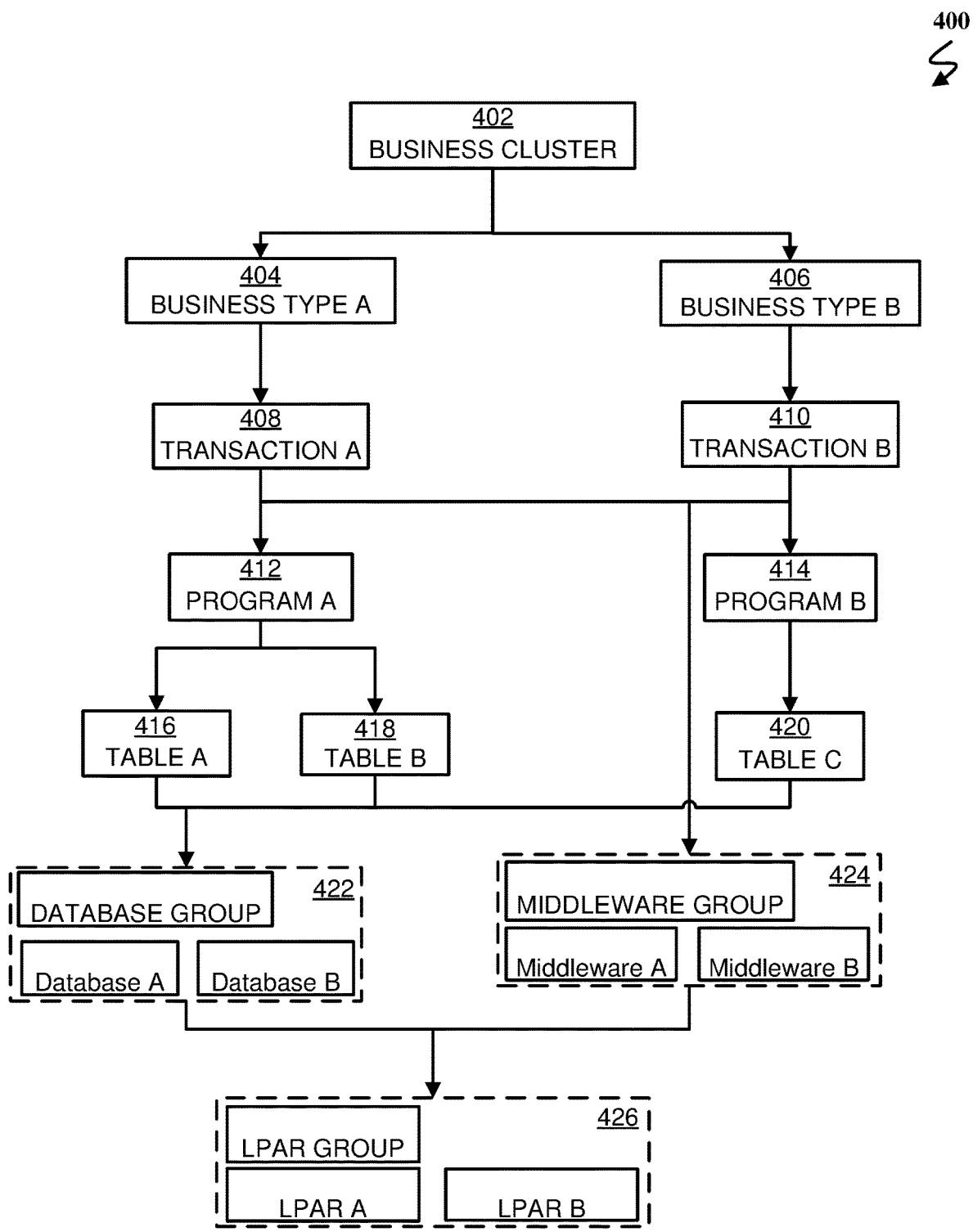
FIG. 4 illustrates a structural mainframe model generated by a mainframe structuring program according to at least one embodiment.

Referring now to FIG. 4, a structural mainframe model 400 of an embodiment of the present disclosure is depicted. The structural mainframe model 400 may be an outcome after the mainframe structuring program 110a and 110b (FIG. 1) has performed the operations described in FIG. 2 and FIG. 3. The structural mainframe model 400 includes a business cluster 402 that may include a particular area of business that includes substantially similar transactions (e.g., a bank or an online retailer). The business cluster 402 may include one or more types of businesses, such as business type A 404 and business type B 406 that may include substantially similar roles (e.g., mortgage or product forecasting) within the business cluster 402. For example, business type A 404 may include all mortgage related transactions within the business cluster 402 (e.g., a bank) and business type B may include all product forecasting within the business cluster 402 (e.g., the bank). The business type B 404 may include one or more transactions, such as transaction A 408 and transaction 410 that may be related to mortgage transactions. Transaction A 408 may have a program A 412 that processes information outputted from transaction A 408, and transaction B 410 may have a program B 414 that processes information outputted from transaction B 410. Program A 412 may have one or more database tables (i.e., table A 416 and table B 418) that may include information associated with program A 412. Likewise, program B 414 may have one or more database tables (i.e., table C 420) that may include information associated to program B 414. The structural mainframe model 400 may include a database (e.g., DB2®) Group 422 comprising one or more databases and a middleware (e.g., CICS®) group 424 that comprises one or more middleware components. The database group may process data outputted from table A 416, table B 418, and table C 420. The middleware group 424 may process data outputted from both transaction A 408 and transaction B 410. All the data transmitted to the database group 422 and the middleware group 424 may be transmitted to a logical partitioning (LPAR) group 426.

In some embodiments, driving rules may be implemented in order to more accurately display a status of a particular hardware or software within the mainframe, which may be useful for an IT professional who wants to determine a business impact when any hardware component within the mainframe malfunctions and is viewing the status of the mainframe from a monitor. The status of a hardware component may be, for example, good, bad, or marginal. The status of the hardware may be affected by a proceeding hardware component in the structural mainframe model 400 (e.g., the business type may affect the transaction and/or the transaction may affect the table) or by a following hardware component in the structural mainframe model 400 (e.g., the table may affect the transaction). A driving rule for each hardware unit may be defined starting with the business type. For example, when a transaction (e.g., transaction A 408) is at least seventy percent nonfunctioning, then the business type A 404 or any preceding business type may have a status displayed as bad. When a transaction (e.g., transaction A 408) is at least thirty percent nonfunctioning, then the business type A 404 or any preceding business type may have a status displayed as marginal.

When a transaction (e.g., transaction A 408) receives a bad event or when a business type (e.g., business type A 404) outputs incorrect data, then the transaction A 408 may be displayed as bad, or may alert a user with a message that includes information of the bad event. When transaction A 408 outputs incorrect data at a rate of at least forty percent to CICS® group 424, then the status of CICS® group 424 may be displayed as bad, or may alert a user with a message that includes information of the bad event. When transaction A 408 outputs incorrect data at a rate of at least ten percent to CICS® group 424, then the status of CICS® group 424 may be displayed as marginal, or may alert a user with a message that includes information of the marginal event. If at any time CICS® A or CICS® B of the CICS® group 424 receive incorrect data, then the status of the transaction A 408 may be displayed as bad, or may alert a user with a message that includes information of the bad event. Similarly, when table A 416, table B 418, or table C 420 receive any incorrect output from program A 412 or program B 414, then the status of the table A 416, table B 418, or table C 420 may be displayed as bad, or may alert a user with a message that includes information of the bad event.

For example, the driving rules and driving condition may be described as shown below in the table:

| Service type | Driving Rule | Driving condition |
|---|---|---|
| Business | Good, Marginal, Bad Aggregation Rule | Child service node may be a transaction service. When 70%+ child service status is bad (has more than a 70% fail rate), it is bad; when 30% child service is bad (has more than a 30% fail rate), it is Marginal. |
| Transaction | Incoming status Rule | When it receives a failed transaction, the service status is bad. |
| | Good, Marginal, Bad Aggregation Rule | Child service node is middleware (e.g., CICS ®) group. When 40%+ child service status is bad (has more than a 40% fail rate), it is bad; when 10%+ child service status is bad (has more than a 10% fail rate), it is marginal. |
| Single point Middleware | Incoming status Rule | When 100% child service status is marginal, it is bad; when 50%+ child service is Marginal, it is Marginal. When it receives bad event, the service status is bad. |
| Middleware Group | Incoming status Rule | Child service node is middleware region service. When 100% child service nodes are marginal, the service status is bad; or When 20% child service is Bad (has more than a 20% fail rate), the service status is bad |
| Database table | Incoming status Rule | When it receives a failed transaction, the service status is bad. |
| | Good, Marginal, Bad Aggregation Rule | Child service is database group. When 100% child service status receives failed transactions, it is bad; when 100% child service status is marginal, it is marginal. |
| Database Data Sharing Group | Incoming status Rule | When 100% database members in the database group are unavailable, the service status is bad; otherwise it is marginal. |

Additionally, a parent (e.g., transaction A 408) child (e.g., program A 412) relationship may include the following types: a containing relationship, a cluster relationship, a run-on relationship, and a call relationship. A containing relationship (aggregation relationship) may include a parent node (e.g., business type A 408) containing multiple independent child nodes (e.g., transaction A 408 and transaction B 410). The cluster relationship may include a parent node as the cluster node (business cluster A 402) of multiple child nodes (business type A 404 and business type B 406), where the characteristic may be multiple child nodes may be redundant (or symmetric) and a single node failed transaction may not impact parent node availability. The run-on relationship parent node running on a child node (e.g., transaction A 404 may run on middleware group 424, middleware group 424 may run on LPAR group 426, database group 422 may run on LPAR group 426 and table A 416 may run on database group 422. The call relationship may be that the parent node may call child node (e.g., middleware group 424 may call program A 412 or table A 416 may call program A 412).

It may be appreciated that FIGS. 2 through 4 provide only an illustration of one embodiment and do not imply any limitations with regard to how different embodiments may be implemented. Many modifications to the depicted embodiment(s) may be made based on design and implementation requirements.

Figure 5:
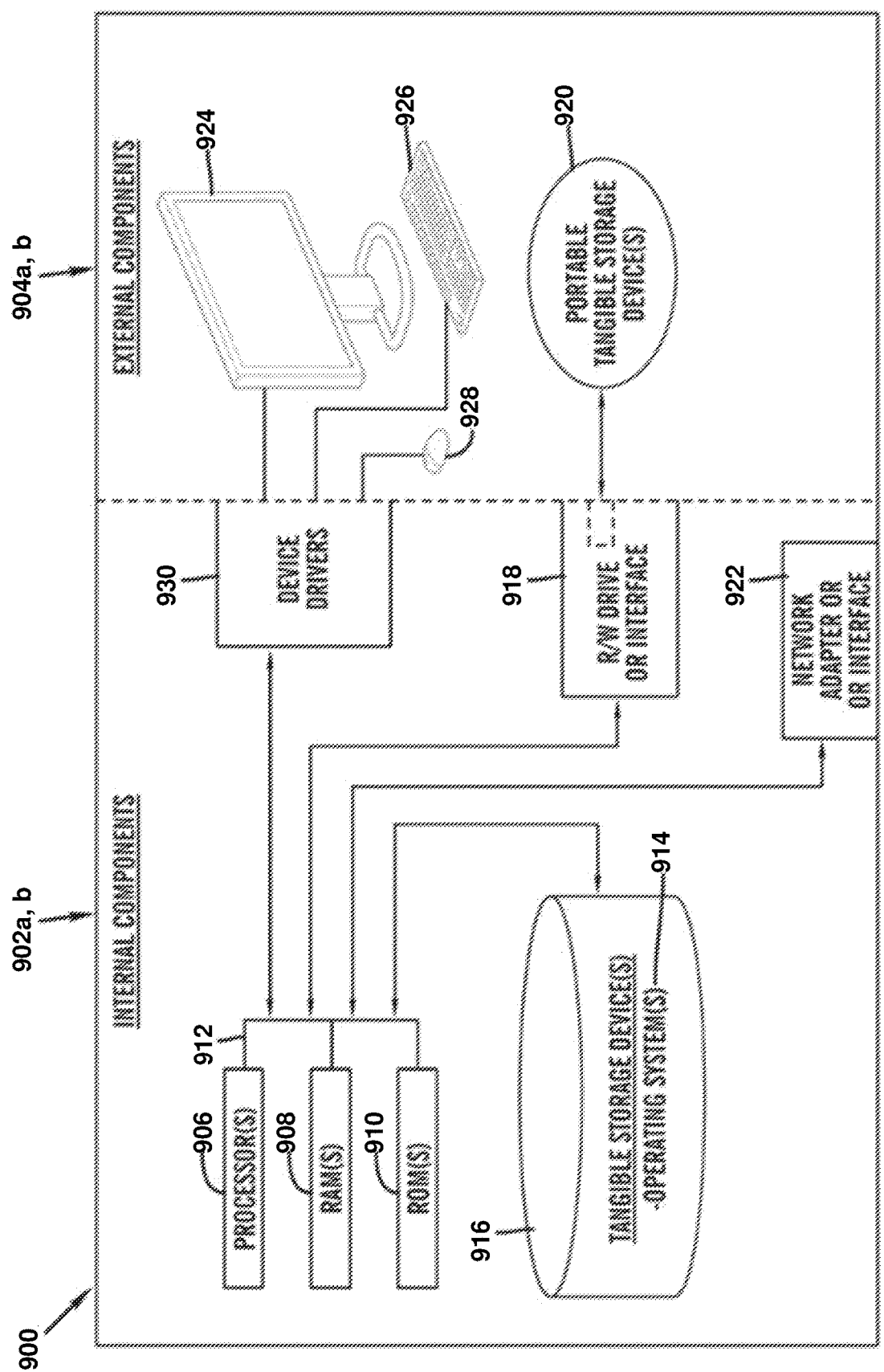
FIG. 5 is a block diagram of internal and external components of computers and mainframes depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the mainframe structuring program 110a (FIG. 1) in client computer 102 (FIG. 1) and the mainframe structuring program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the mainframe structuring program 110a and 110b (FIG. 1) can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the mainframe structuring program 110a (FIG. 1) in client computer 102 (FIG. 1) and the mainframe structuring program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the mainframe structuring program 110a (FIG. 1) in client computer 102 (FIG. 1) and the mainframe structuring program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
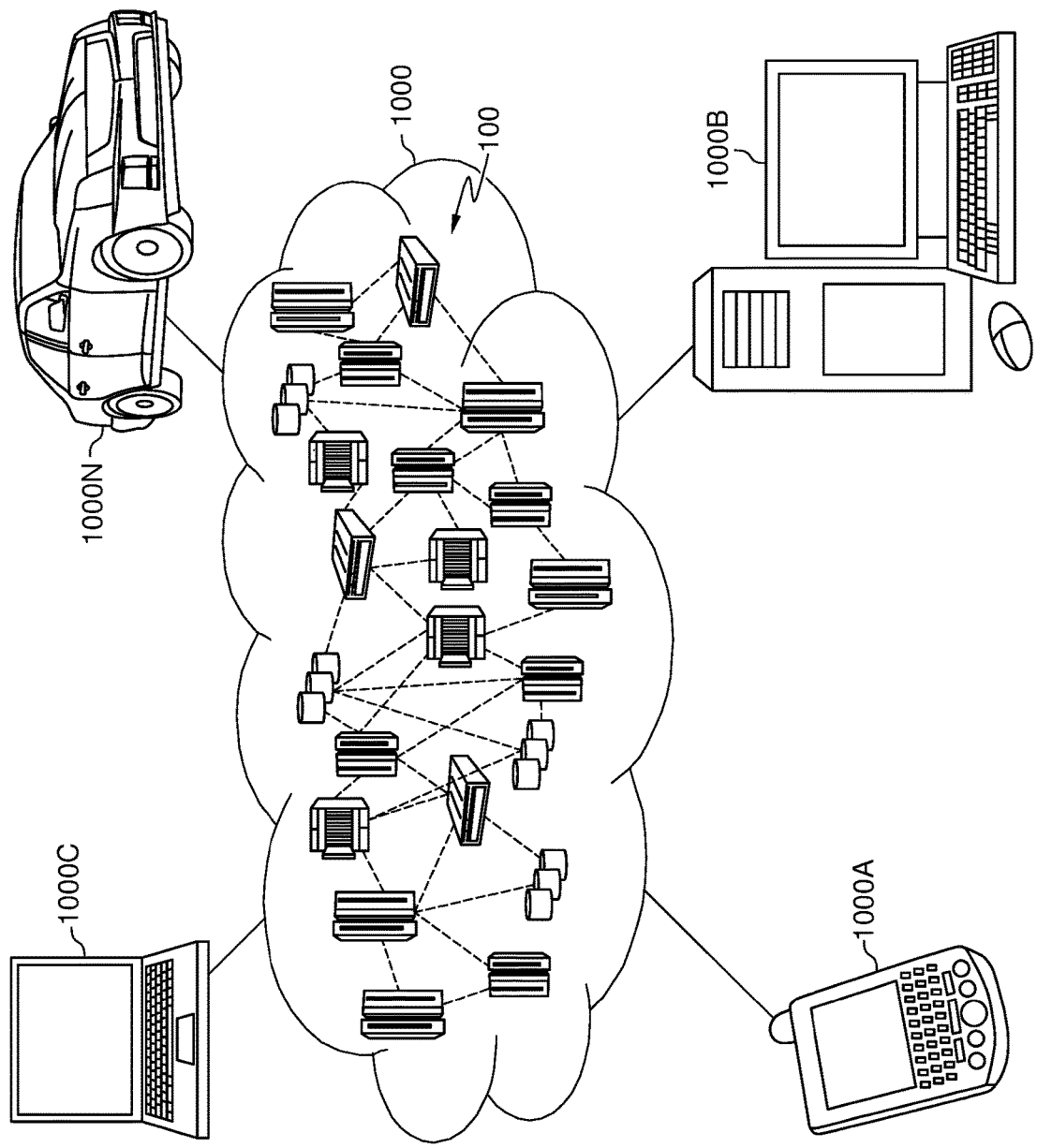
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
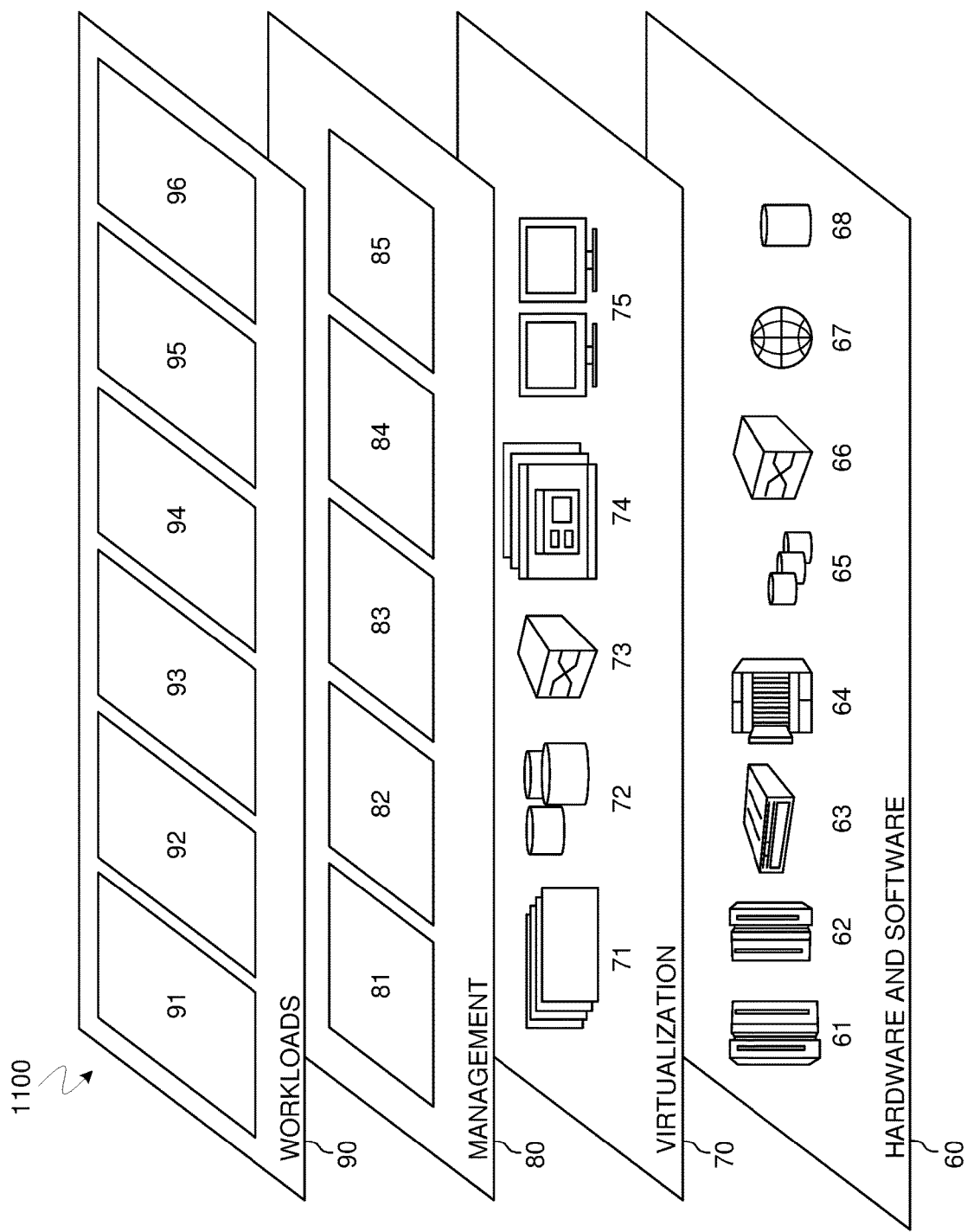
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mainframe structuring 96. Mainframe structuring 96 provides a way to dynamically parse the webpage for content, as well as collect contextual data from one or more sources, then identify a relationship between the parsed content and the collected contextual data. Mainframe structuring 96 discovers resources within a mainframe, and then creates a model of a mainframe that includes a transaction layer, middleware layer, database layer, and a software layer, in order to determine a business impact caused by a business transaction, and then displays the model within a UI.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   structuring, by a processor, a mainframe of an organization, the mainframe including a transaction layer and a middleware layer and an operating system layer, wherein the transaction layer comprises applications and transactions of the application that are each indivisible computing operations to be executed on the transaction layer, wherein the processor structures the mainframe by:

defining a transaction relationship that relates a plurality of transactions of the transaction layer to an associated type of action of the organization;

loading the defined transaction relationship into a mainframe repository that stores type data and transaction data, where the action is stored as action data and each of the plurality of associated transactions is stored as transaction data;

identifying, by running an operating system (OS) discovery library adapter (DLA), a plurality of resources of the mainframe that may be used to execute the plurality of transactions, wherein the plurality of resources includes at least one processor and at least one memory;

identifying, by running middleware DLA, one or more transaction access paths between the transaction layer and the middleware layer to a first set of resources of the plurality of resources that are associated with middleware of the middleware layer;

generating, in the mainframe repository, a middleware DLA book that lists each of the first set of resources and includes respective identified transaction access path for each of the first set of resources;

preprocessing, in the mainframe repository, an OS DA book that includes a second set of resources of the plurality of resources that are associated with an OS of the operating system layer;

loading, and in the mainframe repository, both the OS DLA book and the middleware DLA book to a service manager (SM) service component repository (SCR); and generating a service model of the mainframe that includes a visual representation of the plurality of transactions and the plurality of resources that are related to the relationship across the middleware layer and the transaction layer and the operating system layer of the mainframe.

2. The method of claim 1, further comprising:
displaying, by the processor, the service model of the mainframe.

3. The method of claim 2, wherein the service model is displayed to a user within a user interface (UI).

4. The method of claim 3, wherein the UI is adjustable by a user.

5. The method of claim 1, wherein the associated type of action of the organization is defined by driving rules that are predefined by a user.

6. The method of claim 5, wherein the driving rules categorize the transaction relationship based on a fail rate, wherein the category depends on the fail rate of a transaction.

7. A system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

structuring a mainframe of an organization, the mainframe including a transaction layer and a middleware layer and an operating system layer, wherein the transaction layer comprises applications and transactions of the application that are each indivisible computing operations to be executed on the transaction layer, wherein the mainframe is structured by:

defining a transaction relationship that relates a plurality of transactions of the transaction layer to an associated type of action of the organization;

loading the defined transaction relationship into a mainframe repository that stores type data and transaction data, where the action is stored as action data and each of the plurality of associated transactions is stored as transaction data;

identifying, by running an operating system (OS) discovery library adapter (DLA), a plurality of resources of the mainframe that may be used to execute the plurality of transactions, wherein the plurality of resources includes at least one processor and at least one memory;

identifying, by running middleware DLA, one or more transaction access paths between the transaction layer and the middleware layer to a first set of resources of the plurality of resources that are associated with middleware of the middleware layer;

generating, in the mainframe repository, a middleware DLA book that lists each of the first set of resources and includes respective identified transaction access path for each of the first set of resources;

preprocessing, in the mainframe repository, an OS DA book that includes a second set of resources of the plurality of resources that are associated with an OS of the operating system layer;

loading, and in the mainframe repository, both the OS DLA book and the middleware DLA book to a service manager (SM) service component repository (SCR); and generating a service model of the mainframe that includes a visual representation of the plurality of transactions and the plurality of resources that are related to the relationship across the middleware layer and the transaction layer and the operating system layer of the mainframe.

8. The computer system of claim 7, further comprising:
displaying, by the processor, the service model of the mainframe.

9. The computer system of claim 8, wherein the service model is displayed to a user within a user interface (UI).

10. The computer system of claim 9, wherein the UI is adjustable by a user.

11. The computer system of claim 7, wherein the associated type of action of the organization is defined by driving rules that are predefined by a user.

12. The computer system of claim 11, wherein the driving rules categorize the user transaction relationship based on a fail rate, wherein the category depends on the fail rate of a transaction.

13. A computer program product comprising:
one or more computer-readable storage medium and program instructions stored on at least one of the one or more tangible storage medium, the program instructions executable by a computer to cause the computer to:

structuring a mainframe of an organization, the mainframe including a transaction layer and a middleware layer and an operating system layer, wherein the transaction layer comprises applications and transactions of the application that are each indivisible computing operations to be executed on the transaction layer, wherein the mainframe is structured by:

defining a transaction relationship that relates a plurality of transactions of the transaction layer to an associated type of action of the organization;

loading the defined transaction relationship into a mainframe repository that stores type data and transaction data, where the action is stored as action data and each of the plurality of associated transactions is stored as transaction data;

identifying, by running an operating system (OS) discovery library adapter (DLA), a plurality of resources of the mainframe that may be used to execute the plurality of transactions, wherein the plurality of resources includes at least one processor and at least one memory;

identifying, by running middleware DLA, one or more transaction access paths between the transaction layer and the middleware layer to a first set of resources of the plurality of resources that are associated with middleware of the middleware layer;

generating, in the mainframe repository, a middleware DLA book that lists each of the first set of resources and includes respective identified transaction access path for each of the first set of resources;

preprocessing, in the mainframe repository, an OS DA book that includes a second set of resources of the plurality of resources that are associated with an OS of the operating system layer;

loading, and in the mainframe repository, both the OS DLA book and the middleware DLA book to a service manager (SM) service component repository (SCR); and generating a service model of the mainframe that includes a visual representation of the plurality of transactions and the plurality of resources that are related to the relationship across the middleware layer and the transaction layer and the operating system layer of the mainframe.

14. The computer program product of claim 13, further comprising:

displaying, by the processor, the service model of the mainframe.

15. The computer program product of claim 14, wherein the service model is displayed to a user within a user interface (UI).

16. The computer program product of claim 15, wherein the UI is adjustable by a user.

17. The computer program product of claim 13, wherein the associated type of action of the organization is defined by driving rules that are predefined by a user.

18. The computer program product of claim 17, wherein the driving rules categorize the user transaction relationship based on a fail rate, wherein the category depends on the fail rate of a transaction.

* * * * *